United States Patent
Desbiolles et al.

(10) Patent No.: US 6,686,713 B2
(45) Date of Patent: Feb. 3, 2004

(54) PULSE-CONTROLLED ELECTRIC POWER-ASSISTED STEERING SYSTEM

(75) Inventors: Pascal Desbiolles, Thorehs-Glieres (FR); Christophe Nicot, Quintal (FR); Achim Friz, Seynod (FR)

(73) Assignee: S.N.R. Roulements, Annecy Cedex (FR)

(*) Notice: Subject to any disclaimer, the term of this patent is extended or adjusted under 35 U.S.C. 154(b) by 0 days.

(21) Appl. No.: 10/254,758

(22) Filed: Sep. 26, 2002

(65) Prior Publication Data

US 2003/0057902 A1 Mar. 27, 2003

(30) Foreign Application Priority Data

Sep. 26, 2001 (FR) .............................. 01 12379

(51) Int. Cl.[7] .............................................. H02R 23/00
(52) U.S. Cl. .................. 318/254; 318/138; 318/439
(58) Field of Search .................. 360/97.01; 310/156; 318/254, 138, 439

(56) References Cited

U.S. PATENT DOCUMENTS

| | | | | |
|---|---|---|---|---|
| 5,103,225 A | * | 4/1992 | Dolan et al. ................... 341/13 |
| 5,320,421 A | * | 6/1994 | Kade et al. .................. 303/162 |
| 5,385,394 A | * | 1/1995 | Leppek et al. ............ 303/115.2 |
| 5,392,176 A | * | 2/1995 | Anderson ................ 360/97.01 |
| 5,431,413 A | | 7/1995 | Hajzler |
| 5,558,409 A | * | 9/1996 | Walenty et al. ................ 303/10 |
| 5,642,044 A | * | 6/1997 | Weber .................... 324/207.25 |
| 5,774,068 A | | 6/1998 | Seki |
| 5,898,301 A | | 4/1999 | La Croix et al. |
| 5,955,878 A | | 9/1999 | Peilloud et al. |

FOREIGN PATENT DOCUMENTS

| | | |
|---|---|---|
| WO | WO 97/07220 | 6/1990 |
| WO | WO 97/47079 | 12/1997 |
| WO | WO 99/17082 | 4/1999 |
| WO | WO 00/62020 | 10/2000 |
| WO | WO 00/75673 A1 | 12/2000 |

* cited by examiner

Primary Examiner—Karen Masih
(74) Attorney, Agent, or Firm—Arent Fox Kintner Plotkin & Kahn

(57) ABSTRACT

The invention relates to an electric power-assisted steering system making it possible to apply an assist torque for the angular displacement of the wheels of a vehicle, said torque being applied by an electronically commutated motor (2) comprising P phases and N pairs of poles, said system also comprising a device for controlling the motor (2) comprising a circular multipole encoder (17) comprising a main multipole track (17a) and a multipole commutation track (17b) comprising magnetic singularities (17b1–17b6) equidistributed angularly, a fixed sensor (19) capable of delivering square digital signals A, B in quadrature, and a signal C in the form of 2*P*N pulses per revolution of the rotor (3), a circuit for commutating (20) the currents in the phase windings of the motor (2) and a control circuit (21) for the commutation circuit (20).

15 Claims, 6 Drawing Sheets

PULSE-CONTROLLED ELECTRIC POWER-ASSISTED STEERING SYSTEM

The invention relates to an electric power-assisted steering system making it possible to apply an assist torque for the angular displacement of the wheels of a vehicle, said torque being supplied by an electronically commutated motor comprising P phases and N pairs of poles.

The invention is particularly applicable to conventional steering systems comprising a steering column associated mechanically with the wheels by means of a rack pinion and a rack, so as to convert the rotational movement of the steering wheel associated with the column into angular displacement of the wheels.

The invention is also applicable to decoupled steering systems in which there is no direct mechanical link between the steering wheel and the wheels, whether the vehicle is real or belongs to a simulation system.

This simulation can be the subject of a game, connected with training in a driving school, or connected with an interactive driving simulation for the requirements of motor vehicle manufacturers.

On account of their high specific power, electronically commutated motors, or brushless motors, are particularly adapted to be used in an electric power-assisted steering system.

Within the scope of this application, it is necessary to control precisely the commutation of the current in the phases of these motors in order to obtain a torque which is optimum and equal to a set point with the fewest modulations possible.

To do this, use is known of a sensor comprising three sensing elements disposed opposite an encoder having N pairs of poles, said encoder being rotated by the motor.

In the case of a three-phase motor, by providing that the three sensing elements are phase-displaced with respect to one another by a mechanical angle making it possible to supply three electrical signals phase-displaced by 120 electrical degrees, it is possible to control the commutation between the phases of the motor at the right moment.

But this type of implementation can cause modulations of the motor torque which are due in particular to:
  the reluctance torque of the motor;
  faults of commutation of the current from one phase to another depending on the speed of rotation of the motor;
  the absence of overlapping of the trapezoidal EMFs.

There is known, in particular from the document FR-2 749 452, a device for controlling an electronically commutated electric motor which makes it possible to partially avoid the torque faults related to the commutation of the current from one phase to another.

But, in order to avoid the torque modulation related to the motor design (reluctance torque and absence of overlapping of the trapezoidal EMFs), it then becomes necessary to know to a fine degree the absolute position of the rotor in order to control the current in the phases according to the position of the rotor.

Such a control strategy therefore necessitates an additional sensor giving a high-resolution position in addition to the one controlling the commutation.

This type of solution, in providing two sensors, leads to significant integration constraints and a non-optimised cost. Moreover, it can be penalising in terms of mechanical inertia of the rotor.

The invention aims in particular to resolve these drawbacks by proposing an electric power-assisted steering system comprising a two-track encoder movable rotation-wise in front of a single sensor fixed rotation-wise, said sensor being capable, after appropriate electronic processing, of delivering on the one hand signals for commutating the current in the phases and on the other hand high-resolution position signals for allowing the control of the current supplying the phases, with a sufficiently fine resolution to avoid motor torque modulations.

Moreover, the invention is applicable to electric power-assisted steering systems without resulting in significant integration constraints.

To that end, the invention proposes an electric power-assisted steering system making it possible to apply an assist torque for the angular displacement of the wheels of a vehicle, said torque being applied by an electronically commutated motor comprising P phases and N pairs of poles, said system also comprising a device for controlling the motor comprising:
  a circular multipole encoder intended to perform, together with the rotor of the motor, a plurality of revolutions around its axis of rotation, said encoder comprising a main multipole track and a multipole commutation track comprising magnetic singularities equidistributed angularly, the main and commutation tracks being concentric on the encoder;
  a fixed sensor disposed opposite and at air gap distance from the encoder, said sensor comprising at least three sensing elements, at least two of which are positioned opposite the main track so as to deliver square digital signals A, B in quadrature, and at least one of which is positioned opposite the commutation track 30 as to deliver a signal C in the form of 2*P*N pulses per revolution of the rotor;
  a circuit for commutating the currents in the phase windings of the motor having 2*P*N switches;
  a control circuit for the commutation circuit which:
    from the signal C supplies commutation signals for the switches; and
    from the signals A, B and according to a torque set point defines a current set point which controls the current supplying the phase windings of the motor.

Other objects and advantages of the invention will emerge during the description which follows, given with reference to the accompanying drawings, in which.

The invention relates to an electric power-assisted steering system, in particular for a motor vehicle, making it possible to apply an assist torque for the angular displacement of the wheels of a vehicle, said torque being applied by an electronically commutated motor 2 or brushless motor comprising P phases.

The motor 2 typically comprises a rotor 3 having N pairs of North/South magnetic poles and a stator 4 having P coils 5 formed respectively from a phase winding, the rotor 3 being rotated in a known manner by controlling the electrical supply in the P phase windings.

Figures 1, 2:
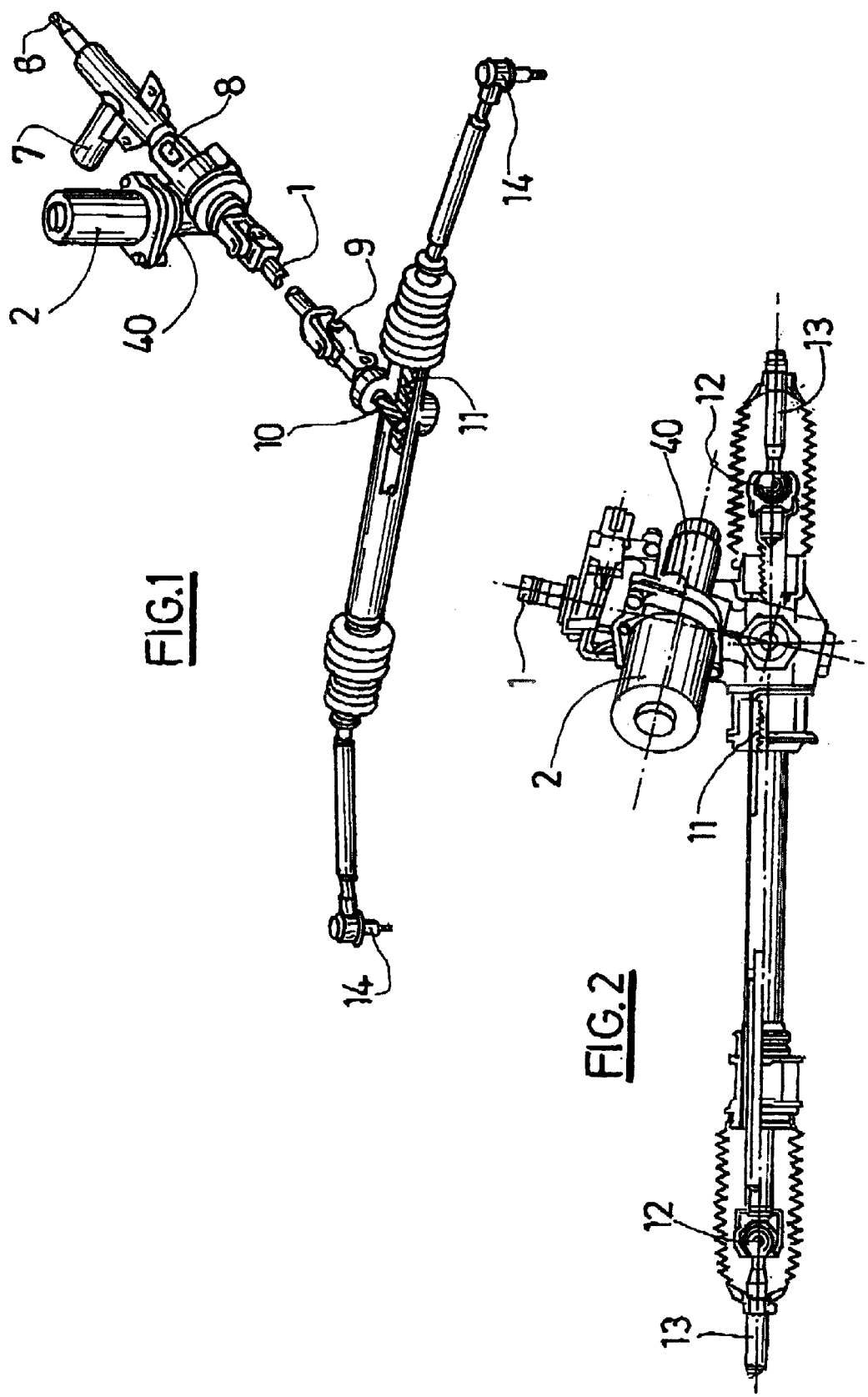
FIG. 1 is a schematic diagram of an electric power-assisted steering system according to a first embodiment.
FIG. 2 is a schematic diagram of an electric power-assisted steering system according to a second embodiment.
Figure 6:
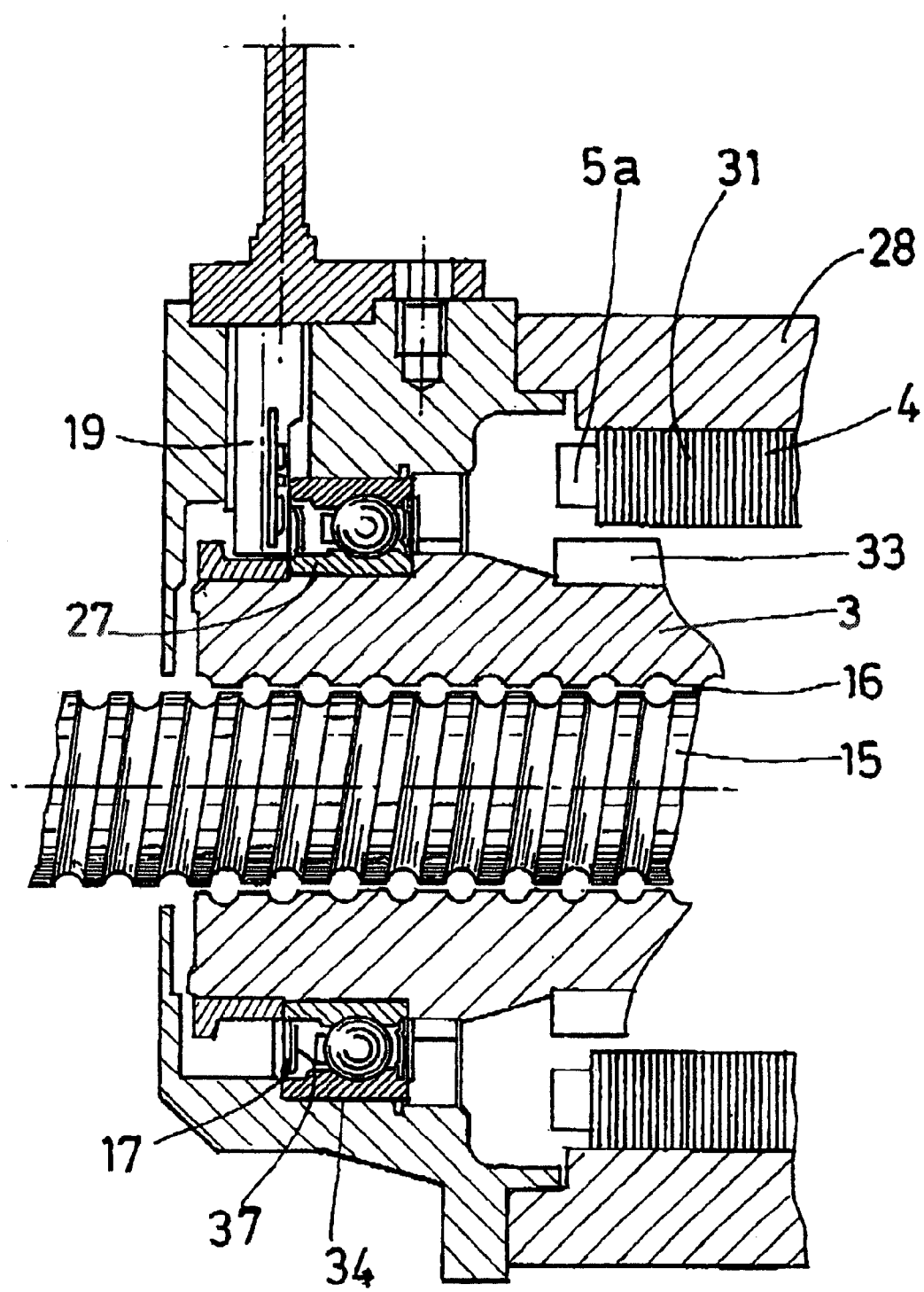
FIG. 6 is a partial view in longitudinal cross-section of an electric power-assisted steering system according to a third embodiment.

FIGS. 1, 2 and 6 depict three embodiments of an electric power-assisted steering system.

In the first embodiment (FIG. 1), the system comprises a column 1 provided with a grooved end part 6 intended to allow the association of the steering wheel with the column 1.

At the end opposite this end part and below a rotationwise stopping device 7, an electronically commutated motor 2 is provided for assisting the rotation of the transmission shaft of the column 1.

This assistance, which will be detailed subsequently, is in particular controlled by a torque sensing device 8, formed for example from a torque rod and an associated sensor, intended to measure the torque applied to the column 1 by the steering wheel, and therefore to define the level of assistance required.

At the end opposite the grooved end part 6, the column 1 is associated, for example by means of a universal joint 9, with a rack pinion 10 intended to engage in the steering rack 11 so as to convert the rotation of the column 1 into a linear displacement of the rack 11.

The ends of the rack 11 are respectively associated, for example by means of a ball joint 12, with a track rod 13 having at the opposite end the steering ball joints 14 which allow the angular displacement of the wheels in one direction or the other according to the direction of displacement of the rack 11.

The second embodiment (FIG. 2) differs from the first in that the motor 2 is associated with the column 1 at the rack pinion 10.

The third embodiment (FIG. 6) differs from the first in that the motor 1 provides the steering assistance at the rack 11 by directly actuating it or a mechanical member, such as a ball screw 15, associated collinearly therewith.

To that end, the rotor 3 has a bore 16 into which the rack 11 or the ball screw 15 is introduced in order to be displaced translationally by the rotation of the rotor 3.

According to the invention, the electric power-assisted steering system comprises a device for controlling the commutation of the current between the phases of the motor 2.

Figure 7:
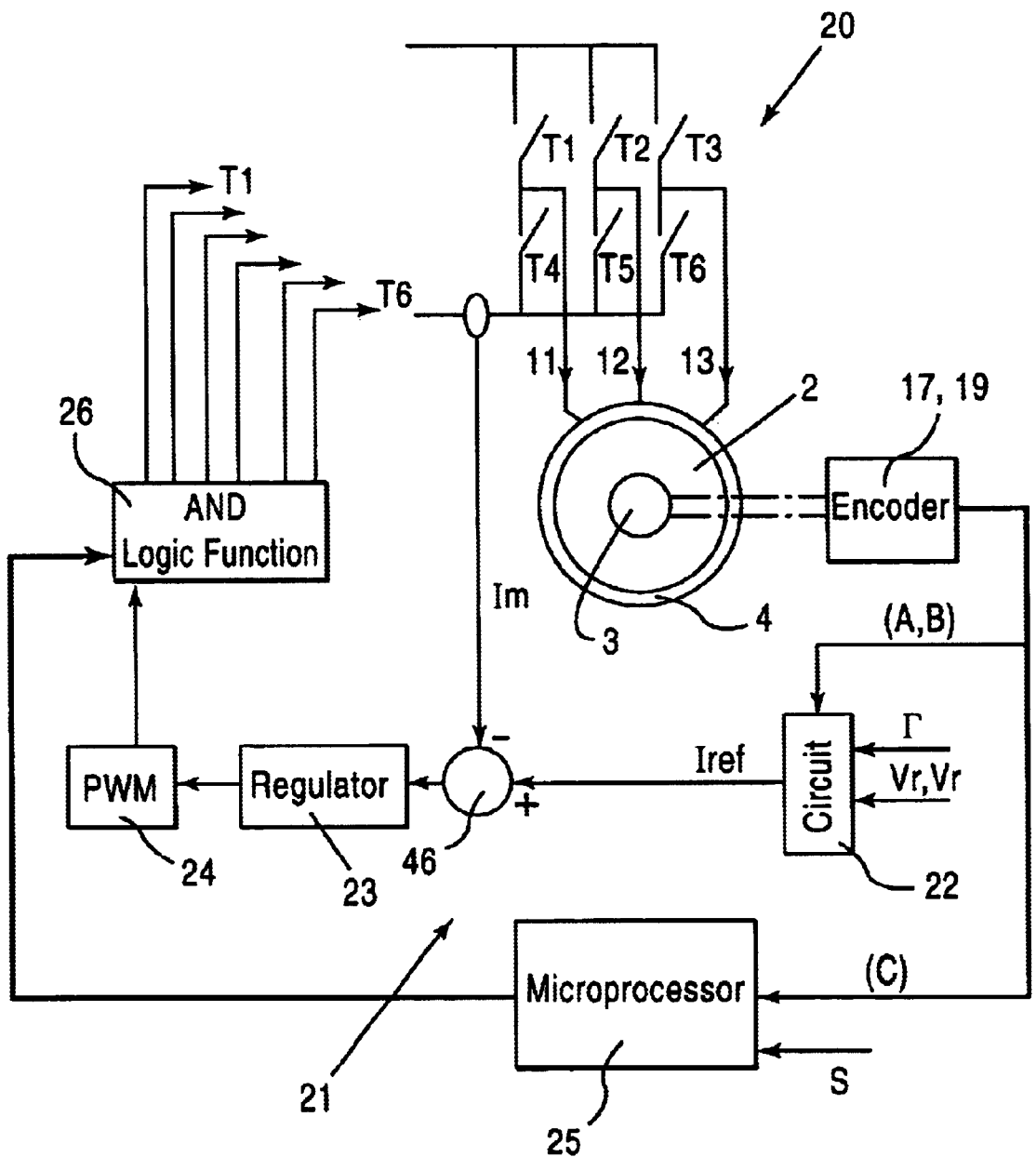
FIG. 7 is a block diagram of a device for controlling an electronically commutated motor according to FIG. 3 comprising 3 phases and one pair of poles.

FIG. 7 depicts a block diagram of a device for controlling such a motor 2 with three phases and one pair of poles.

The device comprises a circular multipole encoder 17 intended to perform, together with the rotor 3, a plurality of revolutions around its axis of rotation.

The encoder 17 comprises a main track 17a and a commutation track 17b comprising magnetic singularities 17b1–17b6 equidistributed angularly, the main track 17a and commutation track 17b being disposed concentrically on the encoder 17.

In one particular example, the encoder 17 is formed from a multipole magnetic ring on which there are magnetised a plurality of pairs of equidistributed North and South poles 18 with a constant angular width so as to form the main track 17a and commutation track 17b, a magnetic singularity 17b1–17b6 of the commutation track 17b being formed from two pairs of poles which are different from the others.

The control device also comprises a fixed sensor 19 disposed opposite and at air gap distance from the encoder 17.

The sensor 19 comprises at least three sensing elements, at least two of which are positioned opposite the main track 17a, and at least one of which is positioned opposite the commutation track 17b.

In one particular example, the sensing elements are chosen from amongst the group comprising Hall effect sensors, magnetoresistors and giant magnetoresistors.

The sensor 19 used is capable of delivering two periodic electrical signals S1, S2 in quadrature by means of the sensing elements disposed opposite the main track 17a and an electrical signal S3 by means of the sensing elements disposed opposite the commutation track 17b.

The principle of obtaining the signals S1 and S2 from a plurality of aligned sensing elements is for example described in the document FR-2 792 403 originating from the applicant.

But sensors 19 comprising two sensing elements which are capable of delivering the signals S1 and S2 are also known.

Figure 9:
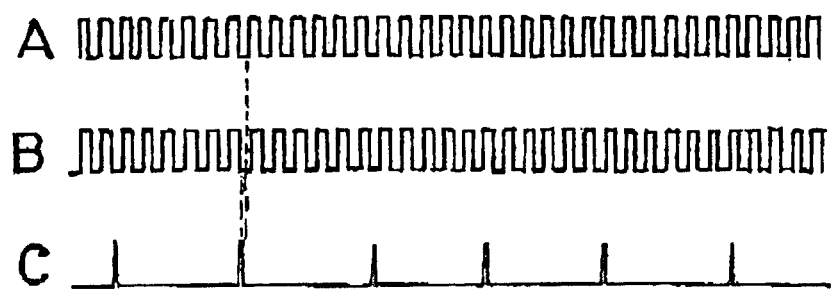
FIG. 9 depicts the signals A, B and C delivered by the sensor during rotation of the encoder depicted in FIG. 8.

The sensor 19 also comprises an electronic circuit which, from the signals S1, S2 and S3, delivers square digital signals A, B in quadrature and digital signal C in the form of 6 (P=3 and N=1) electrical pulses per revolution of the rotor (see FIG. 9).

One principle of obtaining the digital signals A, B and C, as well as different embodiments of the magnetic singularities 17b1–17b6, are described in the documents FR-2 769 088 and EP-0 871 014.

By means of an adapted electronic processing of the signals A, B and C, it is possible to obtain to a fine degree the speed of rotation, the angular position and/or the direction of rotation of the encoder 17 with respect to the sensor 19.

According to one implementation, the sensor 19 also comprises an interpolator, for example of the type described in the document FR-2 754 063 originating from the applicant, making it possible to increase the resolution of the output signals.

The sensor 19 can be integrated on a substrate of silicon or equivalent, for example GaAs, so as to form an integrated circuit customised for a specific application, a circuit sometimes designated by the term ASIC for referring to an integrated circuit designed partially or completely according to requirements.

Although the description is given in connection with a magnetic encoder/sensor assembly, it is also possible to implement the invention in an analogous manner using optical technology. For example, the encoder 17 can be formed from a metal or glass target on which the reference and commutation tracks have been etched so as to form an optical pattern analogous to the multipole magnetic pattern described above, the sensing elements then being formed from optical detectors.

The control device also comprises a circuit for commutating 20 the currents in the phase windings of the motor 2.

The commutation circuit 20 comprises 2*P*N switches T1–T6, for example each formed from a MOSFET type field effect transistor operating at 20 kHz, which are disposed as a bridge so as to supply the phase windings appropriately.

The 2*P*N switches T1–T6 can be actuated in twos according to 2*P*N possible states, the transition from one state to another being controlled by the detection of one of the 2*P*N pulses of the signal C.

In the embodiment depicted in FIG. 7, the commutation device 20 comprises 6 switches T1–T6 which make it possible to supply the three phase windings with respectively a current I1, I2 and I3, I1+I2+I3 being equal to 0.

The control of the commutation device 20, that is to say the selective actuation of the switches T1–T6, is performed by a control circuit 21 which:

from the signal C supplies commutation signals for the plurality of switches T1–T6; and from the signals A, B and according to a torque set point Γ defines a current set point Iref which controls the current Im supplying the phase windings of the motor 2.

The value of the torque Γ measured by the device 8 provided on the column 1 is supplied to a circuit 22 of the control circuit 21 as well as optionally the speed of the vehicle Vv and/or the speed of rotation Vr of the rotor 3 in order to control the value of the current Iref and therefore the level of assistance.

The electronic circuit 22, from the torque set point Γ, introduces a modulation of the set point Iref according to the position of the rotor originating from the signals A and B, this modulation having an amplitude which is a function of the torque Γ and being in phase opposition with respect to the intrinsic torque modulation at the motor 2, in order to obtain a useful torque of the motor 2 free from modulation.

In the embodiment depicted, the control circuit 21 comprises a regulation loop comprising a regulator 23, for example of PID (proportional integral derivative) type, a variable width control (PWM) 24 supplying a 20 kHz square signal, the duty factor of which is controlled by the regulator 23, and a comparator 46 comparing the current Im with Iref originating from the circuit 22.

In a known manner, the regulation loop makes it possible, from Iref, to modulate the current in the phase windings according to the position of the rotor 3 so as to obtain a motor torque constantly equal to the torque set point Γ.

The control circuit 21 can be implemented in the form of a single microprocessor 25 integrating at least one commutation logic for the commutation circuit 20 which determines the sequence of the openings/closings of the different switches T1–T6. Moreover, the direction of rotation desired for the rotor 3, for example represented by the sign S of the torque applied to the column 1, is injected into the microprocessor 25 so as to select the applicable commutation logic.

In a variant, the regulation loop can be implemented in analogue form.

According to one implementation, the control circuit 21, by comparing the current Im supplying the motor 2 with the current set point Iref, makes it possible to modulate the commutation signals in terms of width and duration by means of an AND logic function 26.

Thus, each time one of the 2*P*N pulses of the signal C is detected, two switches are selectively closed so as to supply the corresponding two phase windings with the regulated current Im.

The phase commutation instants can be provided upon the detection of the rising or falling edge of the pulse. In a variant, and in order to improve the accuracy of the commutation, provision can be made that the rising edge is used in one direction of rotation and the falling edge in the other direction.

The operation of the control device of FIG. 7 is then as follows:

the motor 2 is supplied by a current Im so as to allow the rotor 3, and therefore the associated encoder 17, to be rotated;

the sensor 19 delivers the signals A, B representing in particular the position of the rotor 3 and the signal C in the form of 6 pulses per revolution of the rotor 3;

each time a pulse is detected, the microprocessor 25 selectively closes two switches T1–T6 according to the selected commutation logic;

the signals A, B, representing in particular the position of the rotor 3, make it possible, according to the torque set point Γ, to control the current Im supplying the motor 2 so as to limit the modulations thereof.

In one particular example, the commutation logic is controlled so that the rotor field is phase displaced from the stator field by an angle between 60° and 120° so as to optimise the torque supplied by the motor 2.

According to a first implementation (FIGS. 3 and 6), the encoder 17 is associated with the rotating ring 27 of an anti-friction bearing allowing the rotation of the rotor 3.

To that end, the encoder 17 can be overmoulded on an annular frame 37 fitted on the inner ring 27.

Figure 3:
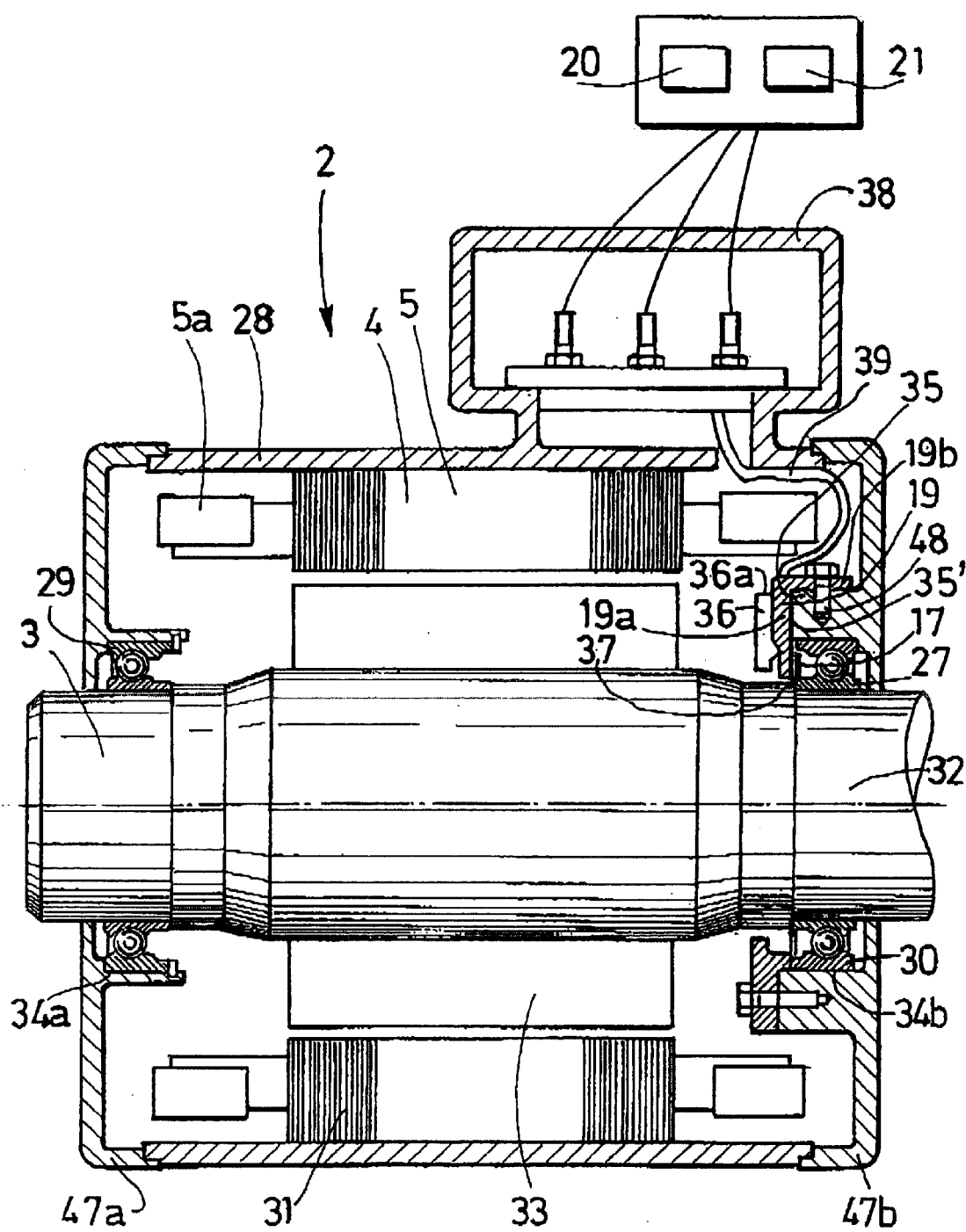
FIG. 3 is a view in longitudinal cross-section of an electronically commutated motor usable in the embodiments of FIGS. 1 and 2.

In the embodiment depicted in FIG. 3, the motor 2 comprises a casing 28 in which on the one hand the stator 4 is housed in a fixed manner and on the other hand the rotor 3 is mounted able to rotate by means of two anti-friction bearings 29, 30.

The stator 4 comprises flux guide plates 31 on which the coils 5 are wound with, at each end of the stator 4, an end winding 5a.

The rotor 3, disposed inside the stator 4, comprises a shaft 32 on the central part of which there are disposed the magnets 33 forming the N pairs of magnetic poles.

On either side of the magnets 33, the rotating inner ring of an anti-friction bearing 29, 30 is fitted on the shaft 32 so as to provide the rotation thereof. To that end, the outer rings of the anti-friction bearings 29, 30 are disposed respectively in a housing 34a, 34b of an end shield 47a, 47b associated with the casing 28 in order to be fixed with respect thereto.

The sensor 19 comprises on the one hand a moulded plastic body 19a in which the sensing elements or the ASIC are integrated and on the other hand a metal insert 19b allowing the association by screwing of the sensor 19 on a support surface 35 of the end shield 47.

This implementation, by resting the sensor 19 on the support surfaces 35, 35', makes it possible to provide the control of the positioning of the sensing elements opposite and at air gap distance from the encoder 17.

Moreover, an end shield 36 provided with an opening 36a so that the body 19a can be positioned facing the encoder 17 is clamped against the external face of the outer ring by three screws distributed at 120° from one another in order to stop any axial displacement of the anti-friction bearing 30. Displacements of the sensor 19 with respect to the encoder 17 are prevented by a screw 48.

In a variant, provision can be made that the sensor 19 is associated with the fixed race of the anti-friction bearing 30 while providing the positioning of the sensing elements opposite and at air gap distance from the tracks of the encoder 17.

Other embodiments of the association of an encoder 17 and a sensor 19 on an anti-friction bearing 30 can be envisaged, in particular those described in the documents FR-2 794 504 and FR-2 700 588 originating from the applicant.

In order to provide the input/output interface for the various electrical signals, the casing 28 is provided with a terminal block 38 capable on the one hand of supplying the motor 2 with current and on the other hand of supplying, by means of a cable 39, the output signals A, B, C of the sensor 19 to the control device.

Figure 8:
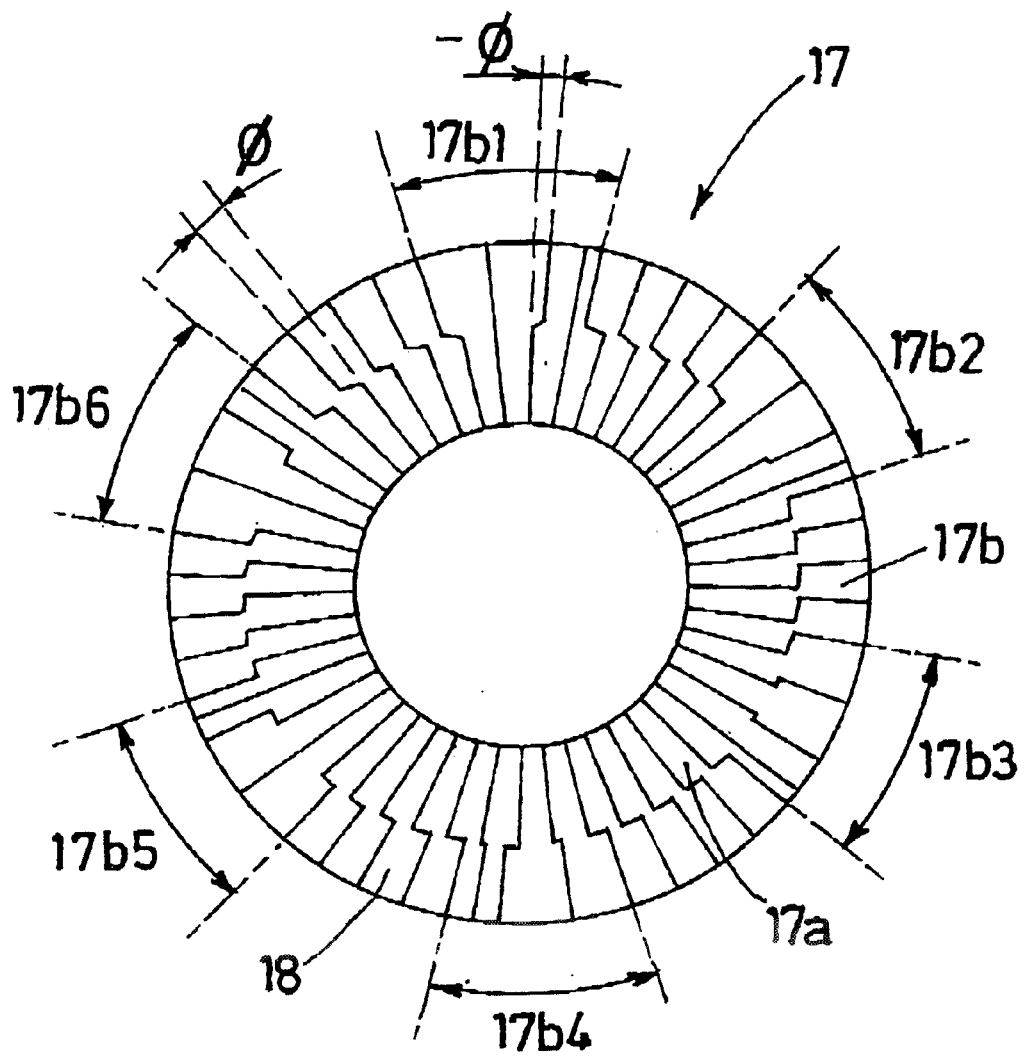
FIG. 8 is a schematic front view of an encoder usable in the control device of FIG. 7.

FIG. 8 shows, within the scope of this implementation, an encoder 17, of which the main track 17a, disposed towards the inside of the ring, and commutation track 17b, disposed towards the outside of the ring, comprise 24 pairs of poles. The pairs of poles 18 of the commutation track 17b are in phase advance by a value φ, for example equal to one eighth of a period, compared with those of the main track 17a.

In this case where P=3 and N=1, the commutation track 17b comprises 6 magnetic singularities 17b1–17b6 spaced apart from one another by two pairs of poles. Each singularity is formed from two pairs of poles 18, the width of the poles being arranged so that they are respectively phase displaced by φ, 0, −φ and 0 with respect to the corresponding poles of the main track 17a. Thus, each pulse of the signal C corresponds to the detection of a phase displacement reversal between the main track 17a and the commutation track 17b.

According to a second implementation (FIGS. 4 and 5), the system comprises, in a conventional manner, a reduction gear 40 of ratio M between the rotation of the rotor 3 and that of the column 1, that is to say that M revolutions of the rotor 3 cause one revolution of the column 1 and the encoder 17 is associated with the rotating ring 41 of an output anti-friction bearing 42 of the reduction gear 40. The reduction gear 40 is associated with the motor 2 so as to form a geared motor.

According to this implementation, the encoder 17 must comprise 2*P*N*M magnetic singularities so that the signal C comprises 2*P*N pulses per revolution of the rotor 3.

Figure 4:
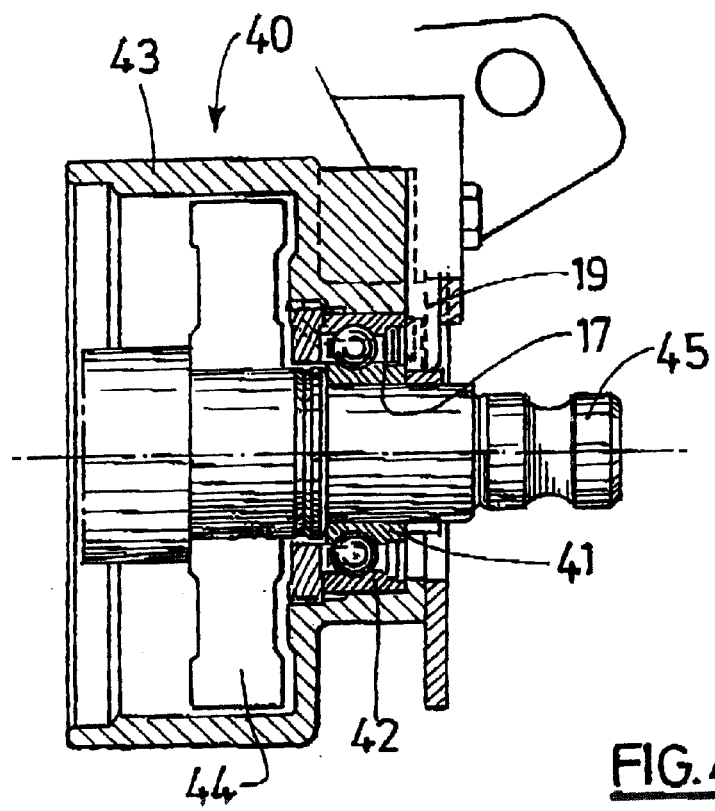
FIG. 4 is a partial view in longitudinal cross-section showing a reduction gear which can be associated with an electric motor usable in the embodiments of FIGS. 1 and 2, so as to form a geared motor.
Figure 5:
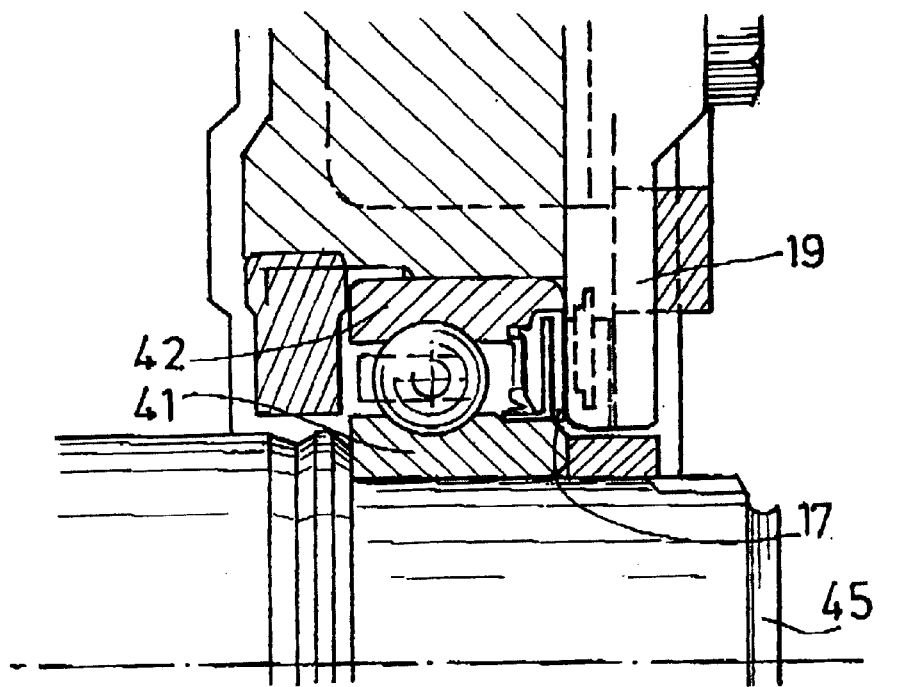
FIG. 5 is a magnified partial view of FIG. 4.

According to the implementation of FIG. 4, the anti-friction bearing 42 is instrumented with the encoder 17 and the sensor 19 in a manner analogous to the embodiment of FIG. 6.

The reduction gear 40 comprises a casing 43 in which the reduction wheel 44 is disposed able to rotate, said wheel 44 being associated rotation-wise, by means of the output anti-friction bearing 42, with a shaft 45 intended to apply the force on the column 1.

Although the description has been given in connection with a conventional steering system comprising a steering column associated mechanically with the wheels, it can be implemented in an analogous manner in a decoupled steering system by providing that the motor applies a force on a rotating member connected to the wheels of the vehicle.

What is claimed is:

1. An electric power-assisted steering system making it possible to apply an assist torque for the angular displacement of the wheels of a vehicle, said torque being applied by an electronically commutated motor (2) comprising P phases and N pairs of poles, said system also comprising a device for controlling the motor (2) comprising:

a circular multipole encoder (17) intended to perform, together with the rotor (3) of the motor (2), a plurality of revolutions around its axis of rotation, said encoder (17) comprising a main multipole track (17a) and a multipole commutation track (17b) comprising magnetic singularities (17b1–17b6) equidistributed angularly, the main (17a) and commutation (17b) tracks being concentric on the encoder (17);

a fixed sensor (19) disposed opposite and at air gap distance from the encoder (17), said sensor (19) comprising at least three sensing elements, at least two of which are positioned opposite the main track (17a) so as to deliver square digital signals A, B in quadrature, and at least one of which is positioned opposite the commutation track (17b) so as to deliver a signal C in the form of 2*P*N pulses per revolution of the rotor (3);

a circuit for commutating (20) the currents in the phase windings of the motor (2) having 2*P*N switches (T1–T6);

a control circuit (21) for the commutation circuit (20) which:

from the signal C supplies commutation signals for the switches (T1–T6); and from the signals A, B and according to a torque set point (Γ) defines a current set point (Iref) which controls the current (Im) supplying the phase windings of the motor (2).

2. A system according to claim 1, characterised in that the encoder (17) is associated with the rotating ring (27) of an anti-friction bearing (30) allowing the rotation of the rotor (3), the commutation track (17b) comprising 2*P*N magnetic singularities (17b1–17b6).

3. A system according to claim 1, characterised in that it comprises, associated with the motor (2), a reduction gear (40) of ratio M between the rotation of the rotor (3) and that of the column (1), the encoder (17) being associated with the rotating ring (41) of an output anti-friction bearing (42) of the reduction gear (40) and the commutation track (17b) comprising 2*P*N*M magnetic singularities.

4. A system according to claim 3, characterised in that the sensor (19) is associated with the fixed ring of the anti-friction bearing (30, 42) having the encoder (17).

5. A system according to any one of claims 1 to 4, characterised in that it comprises a steering column (1), the motor (2) applying a force on the transmission shaft of the column (1).

6. A system according to any one of claims 1 to 4, characterised in that it comprises a steering column (1) associated with a rack pinion (10), the motor (2) applying a force on the rack pinion (10).

7. A system according to any one of claims 1 to 4, characterised in that it comprises a steering rack (11), the motor (2) applying a force on said rack (11) or on a member (15) associated collinearly with said rack (11).

8. A system according to claim 1, characterised in that the control circuit (21) comprises a regulation loop controlled by the current set point (Iref) originating from an electronic circuit (22), said control circuit (21) being capable of modulating the commutation signals in terms of width and duration by means of an AND logic function (26).

9. A system according to claim 1, characterised in that the control circuit (21) is implemented in the form of a microprocessor (25) integrating at least one commutation logic for the commutation circuit (20).

10. A system according to claim 1, characterized in that the encoder (17) is formed from a multipole magnetic ring on which there are magnetised a plurality of pairs of equidistributed North and South poles (18) with a constant angular width so as to form the main track (17a) and commutation track (17b), a magnetic singularity (17b1–17b6) being formed from two pairs of poles which are different from the others.

11. A system according to claim 10, characterised in that the sensing elements are chosen from amongst the group comprising Hall effect sensors, magnetoresistors and giant magnetoresistors.

12. A system according to claim 1, characterised in that the encoder (17) is formed from a target on which the reference (17a) is formed from a target on which the reference (17a) and commutation (17b) tracks have been etched so as to form an optical pattern analogous to a multipole magnetic pattern, the sensing elements then being formed from optical detectors.

13. A system according to claim 11 or 12, characterised in that the sensor (19) comprises a plurality of aligned sensing elements which are disposed opposite and at air gap distance from the main track (17a).

14. A system according to claim 1, characterised in that the sensor (19) comprises an interpolator increasing the resolution of the output signals.

15. A system according to claim 1, characterised in that the sensor (19) is integrated in an ASIC type circuit.

* * * * *